(12) United States Patent
Hofstaedter et al.

(10) Patent No.: US 9,894,514 B2
(45) Date of Patent: Feb. 13, 2018

(54) MULTI-NETWORK SEAMLESS ROAMING MOBILE ROUTER WITH AUTO-DISCOVERY AND MIGRATION OF DOWNSTREAM DEVICES ON THE MOBILE NETWORK

(71) Applicant: NETMOTION WIRELESS, INC., Seattle, WA (US)

(72) Inventors: Christian E. Hofstaedter, Hellertown, PA (US); Randy H. Ellison, Fogelsville, PA (US); Shane L. Baker, Easton, PA (US)

(73) Assignee: NETMOTION WIRELESS HOLDINGS, INC., Seattle, WA (US)

( * ) Notice: Subject to any disclaimer, the term of this patent is extended or adjusted under 35 U.S.C. 154(b) by 0 days.

(21) Appl. No.: 15/355,716

(22) Filed: Nov. 18, 2016

(65) Prior Publication Data
US 2017/0070879 A1    Mar. 9, 2017

Related U.S. Application Data

(63) Continuation of application No. 11/614,773, filed on Dec. 21, 2006.
(Continued)

(51) Int. Cl.
*H04W 8/24* (2009.01)
*H04W 84/00* (2009.01)
(Continued)

(52) U.S. Cl.
CPC ......... *H04W 8/24* (2013.01); *H04L 29/12028* (2013.01); *H04L 61/103* (2013.01);
(Continued)

(58) Field of Classification Search
CPC . H04L 61/2015; H04L 63/0272; H04L 41/12; H04L 63/08; H04L 29/12009;
(Continued)

(56) References Cited

U.S. PATENT DOCUMENTS 5,717,737 A    2/1998   Doviak et al.
6,198,920 B1   3/2001   Doviak et al.
(Continued)

FOREIGN PATENT DOCUMENTS

WO    99/14958       3/1999
WO    02/19636 A1    3/2002
WO    03/075022 A1   9/2003

*Primary Examiner* — Olumide T Ajibade Akonai
(74) *Attorney, Agent, or Firm* — Greenblum & Bernstein, P.L.C.

(57) ABSTRACT

Method for discovering a mobile host that roams across wireless networks, each wireless network comprising a mobile router and the mobile routers being coupled to a gateway. The method includes receiving a packet comprising an address of the mobile host within one of the wireless networks; and determining whether the address of the mobile host resolves to be within a subnet of mobile hosts manageable by the mobile router of the one wireless network. When both the address of the mobile host resolve to be within the subnet of mobile hosts manageable by the mobile router of the one wireless network, the method further includes adding the address of the mobile host to a table of registered mobile hosts for the mobile router of the one wireless network, the packet comprising a dynamic host configuration protocol (DHCP) lease request for the mobile host.

5 Claims, 3 Drawing Sheets

Related U.S. Application Data

(60) Provisional application No. 60/752,402, filed on Dec. 22, 2005.

(51) Int. Cl.

| | | |
|---|---|---|
| *H04L 29/06* | (2006.01) | |
| *H04L 29/12* | (2006.01) | |
| *H04W 8/00* | (2009.01) | |
| *H04W 12/08* | (2009.01) | |
| *H04W 4/02* | (2009.01) | |
| *H04W 8/26* | (2009.01) | |
| *H04W 80/04* | (2009.01) | |
| *H04W 84/18* | (2009.01) | |

(52) U.S. Cl.
CPC ........ *H04L 61/2015* (2013.01); *H04L 63/101* (2013.01); *H04W 4/025* (2013.01); *H04W 8/005* (2013.01); *H04W 12/08* (2013.01); H04L 61/2061 (2013.01); H04W 8/26 (2013.01); H04W 80/04 (2013.01); H04W 84/005 (2013.01); H04W 84/18 (2013.01)

(58) Field of Classification Search
CPC ......... H04L 29/12283; H04L 29/12226; H04L 29/12933; H04W 8/26; H04W 80/04; H04W 80/00; H04W 76/02; H04W 8/24
See application file for complete search history.

(56) References Cited

U.S. PATENT DOCUMENTS

| | | |
|---|---|---|
| 6,418,324 B1 | 7/2002 | Doviak et al. |
| 6,466,571 B1 | 10/2002 | Dynarski et al. |
| 6,826,405 B2 | 11/2004 | Doviak et al. |
| 2002/0021689 A1* | 2/2002 | Robbins ............ H04L 29/12301 370/352 |
| 2002/0059526 A1 | 5/2002 | Dillon et al. |
| 2002/0069278 A1* | 6/2002 | Forslow .............. H04L 63/0227 709/225 |
| 2002/0122394 A1 | 9/2002 | Whitmore et al. |
| 2002/0154638 A1 | 10/2002 | Shahrier |
| 2003/0035409 A1 | 2/2003 | Wang et al. |
| 2003/0142681 A1 | 7/2003 | Chen et al. |
| 2004/0057440 A1 | 3/2004 | Thubert |
| 2004/0162899 A1* | 8/2004 | Dommety ............... H04L 12/14 709/225 |
| 2004/0170181 A1 | 9/2004 | Bogdon et al. |
| 2004/0179539 A1* | 9/2004 | Takeda .............. H04L 29/12301 370/401 |
| 2005/0002419 A1 | 1/2005 | Doviak et al. |
| 2005/0138201 A1 | 6/2005 | Soukup |
| 2005/0243857 A1 | 11/2005 | Hofstaedter et al. |
| 2006/0023676 A1 | 2/2006 | Whitmore et al. |
| 2006/0046716 A1 | 3/2006 | Hofstaedter et al. |
| 2006/0083240 A1 | 4/2006 | Hofstaedter et al. |
| 2006/0146825 A1 | 7/2006 | Hofstaedter et al. |
| 2006/0187956 A1 | 8/2006 | Doviak et al. |
| 2006/0203804 A1 | 9/2006 | Whitmore et al. |

* cited by examiner

MULTI-NETWORK SEAMLESS ROAMING MOBILE ROUTER WITH AUTO-DISCOVERY AND MIGRATION OF DOWNSTREAM DEVICES ON THE MOBILE NETWORK

CROSS REFERENCE TO RELATED APPLICATIONS

This application is a Continuation of U.S. application Ser. No. 11/614,773 filed Dec. 21, 2006, which claims the benefit under 35 U.S.C. 119(e) of U.S. Provisional Application No. 60/752,402 filed Dec. 22, 2005, entitled "Multi-Network Seamless Roaming Mobile Router With Auto-Discovery And Migration Of Downstream Devices On The Mobile Network", the contents of which are incorporated herein by reference in their entireties.

The present application is related to U.S. patent application Ser. No. 11/147,396, filed on Jun. 8, 2005, entitled "Method and Apparatus for Routing Data Over Multiple Wireless Networks," published as U.S. Patent Application Publication No. US 2006/0203804 on Sep. 14, 2006, which is a continuation of U.S. patent application Ser. No. 09/652,009, filed on Aug. 31, 2000, entitled "Method and Apparatus for Routing Data Over Multiple Wireless Networks," now abandoned, the contents of which are expressly incorporated by reference herein in their entireties.

The present application is also related to U.S. patent application Ser. No. 09/527,014, filed on Mar. 16, 2000, now U.S. Pat. No. 6,198,920, entitled "Apparatus and Method for Intelligent Routing of Data between a Remote Device and a Host System," which is a continuation of U.S. patent application Ser. No. 08/932,532, filed on Sep. 17, 1997, now U.S. Pat. No. 6,418,324, entitled "Apparatus and Method for Intelligent Routing of Data between a Remote Device and a Host System," which is a continuation-in-part of U.S. patent application Ser. No. 08/456,860, filed on Jun. 1, 1995, now U.S. Pat. No. 5,717,737, entitled "Apparatus and Method for Transparent Wireless Communication Between a Remote Device and a Host System," the contents of which are expressly incorporated by reference herein in their entireties. The present application is also related to U.S. patent application Ser. No. 11/170,077, filed on Jun. 30, 2005, entitled "Apparatus and Method for Intelligent Routing of Data between a Remote Device and a Host System," published as U.S. Patent Application Publication No. US 2006/0187956 on Aug. 24, 2006, which is a continuation of U.S. patent application Ser. No. 10/898,283, filed on Jul. 26, 2004 (now abandoned), entitled "Apparatus and Method for Intelligent Routing of Data between a Remote Device and a Host System," published as U.S. Patent Application Publication No. 2005/0002419 on Jan. 6, 2005, which is a continuation of U.S. patent application Ser. No. 10/164,581, filed on Jun. 10, 2002, now U.S. Pat. No. 6,826,405, entitled "Apparatus and Method for Intelligent Routing of Data between a Remote Device and a Host System," which is a continuation of U.S. patent application Ser. No. 08/932,532, filed on Sep. 17, 1997, now U.S. Pat. No. 6,418,324 entitled "Apparatus and Method for Intelligent Routing of Data between a Remote Device and a Host System," which is a continuation-in-part of U.S. patent application Ser. No. 08/456,860, now U.S. Pat. No. 5,717,737, entitled "Apparatus and Method for Transparent Wireless Communication Between a Remote Device and a Host System," the contents of which are expressly incorporated by reference herein in their entireties.

BACKGROUND OF THE INVENTION

1. Field of the Invention

The present invention relates to the field of wireless communications. More particularly, the present invention relates to mobile hosts communicating through a separate mobile router that provides seamless mobility services over one or more dissimilar networks.

2. Background Information

Within the last decade, wireless networks and the surrounding ecosystem of mobile computing products have been steadily gaining in market adoption. In many cases, enterprises have realized substantial productivity savings from the deployment of mobility products and services to their mobile workforce. In other cases, they have realized higher degrees of mobile worker flexibility, which have enabled them to offer differentiated products and services to their own markets. The increased flexibility and reduced cost that has been realized by the enterprise mobile workforce has contributed to continue to drive the market adoption rate of these mobility products and services.

Wireless carriers have made large investments building out new third generation public networks like GPRS, EDGE, 1xRTT, and 1xEvDO. Wireless LAN 802.11 networks have experienced widespread adoption and are now commonplace. Further, much of the legacy infrastructure, both private and public, remains in place with the owners of that infrastructure seeking to extend their return on the legacy investments.

There are existing patents like U.S. Pat. No. 6,826,405 to DOVIAK et al.; U.S. Pat. No. 6,198,920, to DOVIAK et al.; and U.S. Pat. No. 6,418,324, to DOVIAK et al., the contents of which are expressly incorporated by reference herein in their entireties, that teach improved simultaneous utilization of multiple networks. In these patents, users can seamlessly roam between dissimilar networks. As a mobile user goes out of range of a primary network, the user can continue to communicate over an alternate network.

Solutions created for seamless roaming between dissimilar networks have helped to promote the adoption of wireless networks. They allow mobile users to better take advantage of the varying strengths of the different networks and to minimize any limitations that they may exhibit. For example, 802.11 networks provide high bandwidth access over a narrow area and CDMA 1xRTT provides lower bandwidth over a wide area. Clients that are running mobility solutions can be configured to automatically use both networks. When in range of the 802.11 network (whether they are also in range of CDMA 1xRTT or not), they will take advantage of the increased throughput of that network. But when they roam out of the limited coverage area of 802.11 and remain in, or enter into, the coverage area of the CDMA 1xRTT network they will automatically take advantage of that network and its larger coverage area.

While this class of mobility solution substantially enhances the value proposition of enterprise workforce mobility, challenges remain that need to be solved in order to further drive enterprise adoption of workforce mobility products and services.

One such problem is the cost of participating in a wireless network. The cost of host mobility can come in many forms including the capital expenditure associated with the necessary communications devices, any recurring expense associated with network access through the communications device, and the overhead cost that each active communications device represents on the network infrastructure.

Another such problem is the administrative burden that mobility software represents. Traditionally, in order for a host to realize the benefits of seamless mobility, the typical solution requires that the mobile host install and run the mobility software stack locally.

One solution to the problems described involves the deployment of a mobile router that runs a seamless mobility solution and makes those services available to a mobile local area network. In this scenario, the mobile router aggregates access to the network infrastructure for all locally connected mobile hosts. This environment is often referred to as a mobile network. The use of a mobile router mitigates the cost of network access to a large extent by allowing multiple mobile hosts to share the upfront capital, recurring expense, and network overhead costs. However, the use of a mobile router still incurs much of the administrative burden described earlier.

Traditionally, when allowing mobile hosts to make use of the services of a mobile router, it has been required that either the mobile hosts continue to run a mobility software stack in tandem with the mobile router, or the mobile router be statically configured with the identities of the specific mobile hosts to which it will provide services.

In the first case, there is no change in administrative burden. In the second, there has been a reduction, although not an elimination, of administrative burden, but at the cost of a new restriction on mobile host mobility across mobile routers. When a mobile router is statically configured with the identities of the mobile hosts to which it will provide services, the mobile host is required to remain with the mobile router so long as it wishes to retain the same network identity.

In some cases, attempts have been made to provide seamless mobility services through a mobile router while allowing migration of mobile hosts between mobile routers. These attempts have all used Dynamic Host Configuration Protocol (DHCP) to implement the solution with the mobile router granting the DHCP lease from within the subnet range for which it provides mobility services. In this environment, although seamless mobility is maintained while associated with a single mobile router and a mobile host can now migrate between mobile routers, the local IP address of the mobile host must change when it migrates to a new mobile router. Therefore, seamless mobility is not maintained across a migratory event.

Another problem with the attempts that have been made to date is the homogenous nature of the local network of the mobile router. All solutions that have attempted to provide mobile routers offering mobility services to a local network have consisted of mobile routers that service either DHCP mobile hosts or statically addressed mobile hosts, but not both at the same time. However, mobile hosts have varying needs and some require static IP addressing while others require dynamic Internet Protocol (IP) addressing. Even in situations where no such requirement exists, it may be highly desirable to address the mobile hosts in different ways. For example, one host may be a mobile computer for which the administrator would prefer a DHCP address lease allocation. Another host may be a remote controlled camera that is servicing requests from client software running on other host computers. For this host, the administrator may prefer the IP address to be statically configured so that it is well known and easily reached by other host computers. For example, this situation could be present in a mobile vehicle area network in which different shift workers with their own mobile computers share the vehicle but the camera stays with the mobile router in the car. Another example may be a branch office network with workers moving between the branches but IP cameras remaining stationary in relation to the mobile router.

A further problem is access control. With the ability for mobile hosts to move freely between mobile routers and establish active communication sessions between varying mobile routers, questions regarding security and access control for the mobile host will need to be addressed by solution vendors.

Therefore, a need exists to allow for the automatic discovery of mobile hosts by a mobile router that is offering mobility services. Additionally, a need exists for mobile hosts to be able to dynamically migrate from one mobile router to another mobile router while maintaining uninterrupted seamless mobility and a constant local network identity. Further, a need exists to simultaneously support mobile hosts that are configured for static IP addressing as well as mobile hosts that are configured for dynamic IP addressing on the same mobile router. Finally, a need exists to provide migratory seamless mobility to a defined population of mobile hosts while restricting access for any mobile hosts that are not part of the defined population.

SUMMARY OF THE INVENTION

In view of the foregoing, an aspect of the present invention is directed to a mobile router that offers seamless roaming services to one or more locally connected mobile hosts over one or more simultaneously connected networks.

A method is provided for discovering a mobile host that roams across wireless networks. The method includes receiving a packet from the mobile host, the packet including a source address and a destination address. The method also includes determining whether the source address is within a permissible address range, and determining whether the destination address is within a managed address range. When both the source address is within the permissible address range, and the destination address is within the managed address range, it is determined whether the source address is within a table of registered hosts. When the source address is not within the table of registered hosts, the source address is added to the table of registered hosts.

A method is also provided for discovering a mobile host that roams across wireless networks. The method includes receiving a packet destined for the mobile host, the packet including a mobile host address. The method also includes determining whether the mobile host address is within a permissible address range. When the mobile host address is within the permissible address range, it is determined whether the mobile host address is within a table of registered hosts. When the mobile host address is not within the table of registered hosts, the mobile host address is added to the table of registered hosts.

The method may also include, when the source/mobile host address is not within the predefined permissible address range, preventing sending of any packets to the mobile host and also not sending any broadcast packets.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION

According to an aspect of the present invention, a system, a method and a computer program are provided for a multi-network seamless roaming mobile router with automatic discovery of downstream devices on the mobile network.

An aspect of the present invention allows a mobile host to automatically realize the mobility services of a mobile router without any mobility software being present on the mobile host and without any mobile host-specific configuration settings being present on the mobile router. Another aspect of the present invention allows a mobile host to dynamically migrate from one mobile router to another mobile router and automatically realize the mobility services of each mobile router, as appropriate, as the mobile host migrates between the local network service areas of each mobile router. Another aspect of the present invention provides simultaneous support for both statically and dynamically addressed mobile hosts. Another aspect of the present invention provides access control over mobile host connections through mobile routers.

According to an aspect of the present invention, a mobile router offers seamless mobility to locally connected mobile hosts as the mobile router's network access roams across different subnets on similar networks, across networks that are entirely dissimilar, or across a simultaneous combination of both scenarios.

According to an aspect of the present invention, a method is provided for the automatic discovery of mobile hosts by a mobile router.

According to an aspect of the present invention, a method is provided to simultaneously support mobile hosts that are configured for static IP addressing as well as mobile hosts that are configured for dynamic IP addressing.

According to still another aspect of the present invention, a method is provided to support mobile hosts that dynamically migrate from one mobile router to another mobile router while maintaining seamless network mobility.

According to still another aspect of the present invention, a method is provided to restrict access to a mobile router to a defined population of potential mobile hosts.

In yet another aspect of the invention, a computer readable medium is used to store a program for a multi-network seamless roaming mobile router with auto-discovery of downstream devices on the mobile network.

Figure 1:
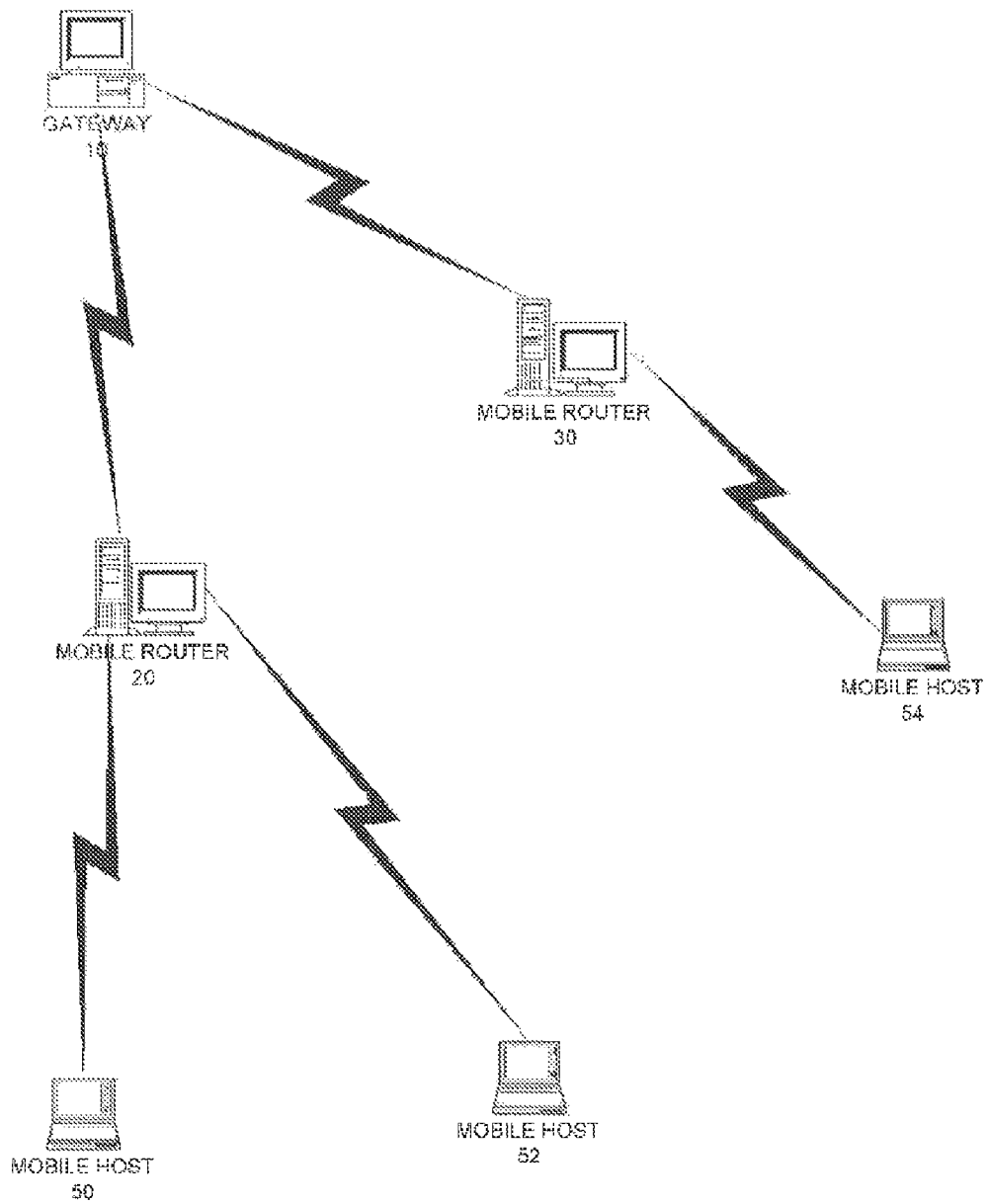
FIG. 1 illustrates a networking environment in which the present invention can operate.

Referring to FIG. 1, a mobile router 20 and a mobile router 30 each wirelessly connect to a gateway 10. Mobile router 20 manages a local area network including mobile host 50 and mobile host 52. Mobile router 30 manages a local area network that only includes mobile host 54. The mobile hosts 50 and 52 are shown wirelessly connected to their mobile router 20, but can travel from the area of one mobile router 20 to the area of another mobile router 30, and thus wirelessly connect to mobile router 30, as described below. Likewise, mobile host 54 is shown wirelessly connected to mobile router 30, but can travel to the area of mobile router 20. Each mobile router 20, 30 maintains a table of mobile hosts 50, 52, 54 that are locally attached to the mobile router 20, 30 on the mobile network and that have been registered with the gateway 10 as being locally connected to the mobile router 20, 30. The gateway 10 may be, for example, a virtual private network (VPN) gateway, or an open gateway with varying levels of access, either of which may be embodied in hardware and/or software. Further, the gateway may contain protocol translators, impedance matchers, rate converters, fault isolators, signal translators, and the like, as the skilled artisan will readily appreciate without departing from the spirit and/or scope of the invention.

Each of the mobile routers 20, 30 may operate in the same manner, in an embodiment of the invention, and therefore the functionality described below with respect to mobile router 20 and its associated mobile hosts 50, 52 also applies to mobile router 30 and its associated mobile host 54.

Figure 2:
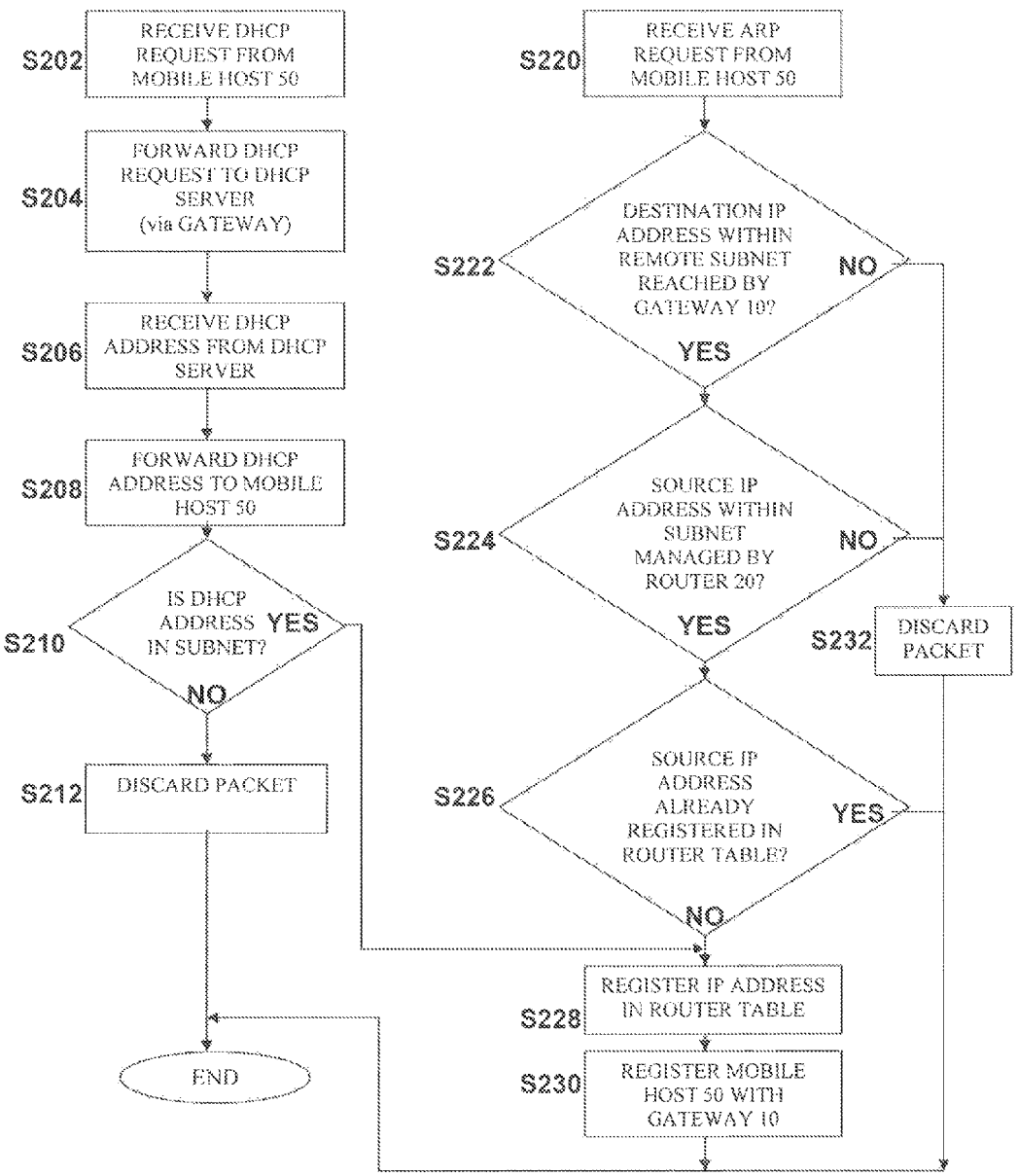
FIG. 2 illustrates a flowchart of an exemplary data communication process in the network environment according to an aspect of the invention.

Initially, the mobile router 20 determines an address of the mobile host 50, e.g., an address, which is to be registered with the gateway 10. The mobile host 50 may obtain an IP address in any manner without departing from the spirit and/or scope of the invention. For example, a Dynamic Host Configuration Protocol (DHCP) server may be used to provide an IP address, in which case the mobile router 20 serves, in part, as a DHCP relay. For example, referring to FIG. 2, in this capacity, the mobile router 20 receives a DHCP lease request (step S202) from the mobile host (MH) 50, and forwards it through the gateway 10 to a DHCP server (step S204). The gateway 10 may be connected to the DHCP server via a wired or wireless communication link, directly or indirectly through a network, such as, for example, a wide area network (WAN), a local area network (LAN), the Internet, or the like. Once the DHCP server sends a packet granting a DHCP address back (step S206) to the mobile router 20 (through the gateway 10), which forwards the packet to mobile host 50 (step S208), the mobile router 20 can assume that the mobile host 50 has realized a successful DHCP lease.

Upon realizing a successful DHCP lease for the mobile host 50, the mobile router 20 determines whether the mobile host 50 that has been granted DHCP address resolves to be within the subnet of mobile hosts allowed to be managed by the mobile router 20 (step S210). This determination is made, e.g., by comparing the media access control (MAC) of the mobile host 50 and/or another unique identifier assigned to mobile host 50, to a list of permissible MAC addresses and/or unique identifiers stored in a local table in mobile router 20. If the DHCP address is within that subnet ("YES" at step S210), then the mobile router 20 adds an entry for the mobile host 50 into the mobile router's own table (step S228). Then, the router 20 registers the mobile host 50 with the gateway 10 (step S230).

However, if the DHCP address is not within the subnet ("NO" at step S210), then the packets are discarded (step S212) and the process ends.

Alternatively, the mobile router 20 can obtain an address for the mobile host 50 by other techniques. For example, the mobile router 20 may also examine every Address Resolution Protocol (ARP) broadcast packet sent (e.g., by the mobile hosts 50 and 52) on the local area network for which the mobile router 20 serves as a gateway (step S220). This includes other mobile hosts (e.g., mobile host 54) which may have traveled into mobile router 20's local area network. Then, if the destination IP address of the ARP broadcast resolves to be within the remote subnet that can be reached via the gateway 10 ("YES" at step S222), and if the source IP address of the ARP broadcast resides within the subnet of hosts that are allowed to be managed by the mobile router 20 ("YES" at step S224), the mobile router 20 checks to see if an entry corresponding to the source IP address is within a registered mobile host table (step S226). However, if the destination IP address of the ARP broadcast does not resolve to be within the remote subnet that can be reached via the gateway 10 ("NO" at step S222), or if the source IP address of the ARP broadcast does not reside within the subnet of hosts that are allowed to be managed by the mobile router 20 ("NO" at step S224), the examined ARP broadcast packet is discarded (step S232) and the process ends.

If the mobile router 20 does not yet have an entry in its table of registered mobile hosts for the source IP address of the ARP broadcast packet ("NO" at step S226), the mobile router 20 adds an entry for the mobile host into the mobile router's local table of registered mobile hosts (step S228) and registers the source IP address of the ARP broadcast packet with the mobile router's gateway 10 (step S230). However, if the mobile router 20 has an entry in its table of registered mobile hosts for the source IP address of the ARP broadcast packet ("YES" at step S226), the process ends. Although DHCP lease transactions can be monitored, it may be preferable to only obtain registration information from ARP requests.

Figure 3:
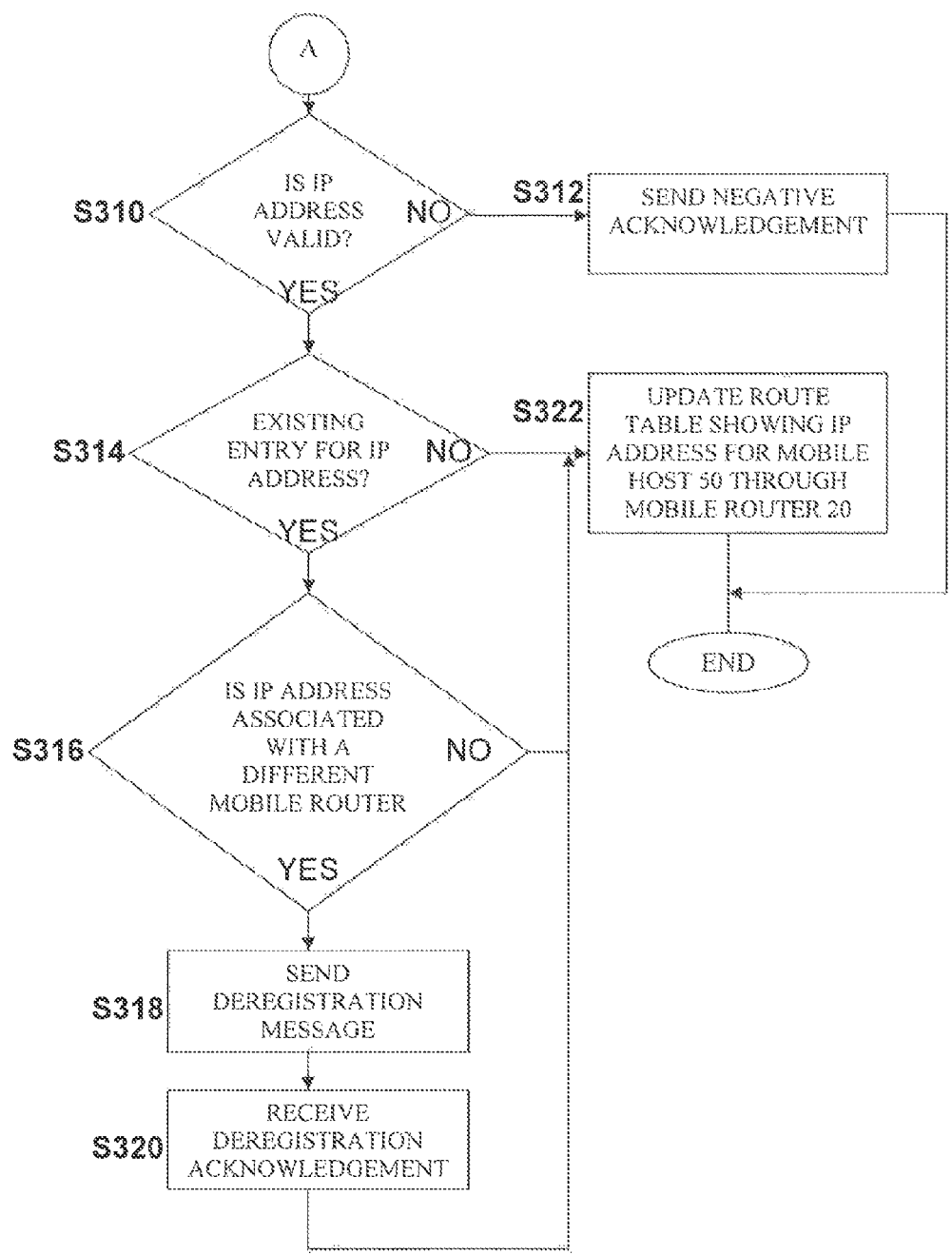
FIG. 3 illustrates a flowchart of a further exemplary data communication process in the network environment according to an aspect of the invention.

In both the DHCP and ARP cases, discussed above, the gateway 10 for a first mobile router 20 receives registration requests from the mobile router 20 (step S230). Referring to FIG. 3, the gateway 10 then verifies that the IP address to which the registration applies is valid for the subnet being managed by the gateway 10 (step S310). When the IP address of the registration request falls outside of the subnet being managed by the gateway 10 ("NO" at step S310), it sends a negative acknowledgement to the mobile router 20 (step S312).

When the IP address for mobile host 50, for example, is within the subnet being managed by the gateway 10 ("YES" at step S310), the gateway 10 examines the gateway's route table for the presence of an entry that resolves to the IP address for which the first mobile router 20 has sent the registration request (step S314). If the entry exists ("YES" at step S314), the gateway 10 determines whether the IP address of mobile host 50 is presently associated with a different mobile router, e.g., mobile router 30 (step S316). Upon learning that the entry exists, but is associated with a different mobile router 30 ("YES" at step S316), the gateway 10 sends a deregistration message to the mobile router 30 (step S318). In response to receiving a deregistration request from a gateway 10, the second mobile router 30 deletes the entry for the mobile host 50 in its local mobile host registration table, and sends an acknowledgement to the mobile router's gateway 10 (step S320).

If the entry does not exist ("NO" at step S314), then no deregistration is needed. In either case, so long as the IP address of the registration request falls within the subnet being managed by the gateway 10, the gateway 10 updates its route table to establish that the IP address of the mobile host 50 is now connected and accessible through the first mobile router 20 that sent the registration request (step S322).

In one embodiment, configuration settings exist on the mobile router 20 itself. In another embodiment, the configuration settings are maintained on the gateway 10 and retrieved by the mobile router 20 at run-time. One of the configuration settings can be, for example, a maximum threshold of time-lapse since traffic was encountered for a mobile host 50, 52. The corresponding mobile router 20 monitors timestamps of the last time that packet traffic was encountered for all of the mobile hosts 50, 52 for which entries exist in the mobile router's table. A mobile host 50, 52 is unregistered from the mobile router's gateway 10 and a mobile host's entry is deleted from a mobile router's local table if the time-lapse since traffic was encountered for the mobile host 50, 52 exceeds the configured threshold.

Another exemplary configuration setting may be a set of IP addresses and IP address ranges that the mobile router 20 is allowed to register with its gateway 10 in order to provide mobility services. The mobile router 20 ignores the presence of any mobile hosts that are disallowed (based upon the range) from receiving mobility services based upon the configuration regardless of the presence of packets or DHCP lease transactions or any other criteria.

The mobile router 20 makes itself invisible to any mobile hosts that are disallowed from receiving mobility services based upon its configuration. A mobile host is considered to be "offending" when its address is not within the subnet of hosts that are allowed to be managed by the mobile router 20. The destination address is not relevant to this particular analysis. The mobile router 20 remains invisible to the offending mobile host, for example, by not sending any packets to the offending mobile host's MAC address and by avoiding sending any ARP broadcasts itself. The mobile router 20 can avoid sending ARP broadcasts on the network because it has already determined the MAC addresses of all valid mobile hosts 50, 52.

The capabilities described herein provide for a mobile router 20, 30 that offers seamless roaming services to one or more locally connected mobile hosts 50, 52, 54 over one or more simultaneously connected networks. Capabilities are provided to a mobile router 20, 30 that offers seamless mobility to locally connected mobile hosts 50, 52, 54 as the mobile router's network access roams across different subnets on similar networks, across networks that are entirely dissimilar, or across a simultaneous combination of both scenarios.

In addition, another aspect of this invention calls out the ability for the automatic discovery of mobile hosts by a mobile router. According to an aspect of the invention, functionality is provided to simultaneously support mobile hosts that are configured for static IP addressing as well as mobile hosts that are configured for dynamic IP addressing. Support is provided to mobile hosts that dynamically migrate from one mobile router to another mobile router while maintaining seamless network mobility.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein may operate as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., IP version 4, IP version 6, UDP/IP, TCP/IP, ICMP, ARP and DHCP), and wireless networking (802.11a, 802.11b, 802.11g, UWB, CDMA 1×RTT, CDMA 1×EVDO, GSM, CDPD, GPRS, EDGE, UMTS, RD-LAP, SMR, LMR) represent examples of the state of the art. Such standards are periodically superseded by faster or more efficient equivalents having essentially the same functions. Accordingly, replacement standards and protocols having the same functions are considered equivalents.

What is claimed is:

1. A method for discovering a mobile host that roams across wireless networks, the method comprising:
    receiving a packet destined for the mobile host, the packet including a mobile host address;
    determining whether the mobile host address is within a permissible address range;
    when the mobile host address is within a managed address range, determining whether the mobile host address is within a table of registered hosts; and
    when the mobile host address is not within the table of registered hosts, adding the mobile host address to the table of registered hosts.

2. The method of claim 1, further comprising:
    when the mobile host address is not within a managed address range, preventing sending of packets to the mobile host and avoiding sending broadcast packets.

3. The method of claim 1, wherein the wireless networks across which the mobile host roams are dissimilar networks.

4. The method of claim 1, wherein the mobile host roams across different subnets on similar networks.

5. The method of claim 4, wherein the wireless networks across which the mobile host roams are dissimilar networks.

* * * * *